Patented Mar. 29, 1938

2,112,374

UNITED STATES PATENT OFFICE 2,112,374

METHOD OF DETERMINING THE FAT CONTENT OF MILK AND DAIRY PRODUCTS

Georg Mayrhofer, Innsbruck, Austria

No Drawing. Application April 11, 1936, Serial No. 73,975. In Austria April 17, 1935

2 Claims. (Cl. 23—231)

This invention relates to determining the fat content of milk, cream, and dairy products. The hitherto known methods for determining the fat content of milk, cream, or dairy products, such as cheese, produced therefrom necessitate the use of a centrifuging device and a water bath to be maintained at a certain temperature, and also presuppose considerable expert knowledge on the part of the person making the test. The most commonly practised and most reliable method uses sulphuric acid the handling of which involves risks.

Seeing that it is a matter of great importance for the dairy trade to be able to carry out fat determining tests without any special preparations, and without the aid of complicated means, at any time and place, without special skill or expert knowledge, attempts have long been made to simplify the fat determining methods in every respect. But even the simplest known method (the "Hauptner" method) necessitates pipetting twice (the milk and the reaction liquid) and also heating for half an hour in a water bath maintained at a certain temperature. With a view to simplifying Gerber's method of fat determining with the aid of sulphuric acid it has also been proposed to lag the butyrometer with an insulating covering so that the heat evolved during intermixture is better conserved and utilized. In this manner it may be possible to dispense with the use of the water bath but not to do without the centrifuging device.

It has also been proposed to employ aqueous solutions of protein-dissolving salts (the "Neusal" method) instead of sulphuric acid, but this method also necessitates the use of a water bath and of a centrifuging device, and thus involves for the non-expert a complicated and time-consuming procedure.

My invention has for its object to provide a fat determining method by which the non-expert can determine the fat content of milk easily, rapidly, anywhere, without any special preparations, by a very simple procedure, and without the necessity for the use of either a centrifuging device, a water bath, or sulphuric acid. The essential characteristic of the method according to the present invention is that the predetermined quantity of matter to be analyzed is shaken up in a butyrometer with solid caustic alkalies and solid acids yielding protein dissolving salts, as also with such an amount of concentrated lower alcohols readily soluble in water that the mixture acquires the degree of thinness necessary to admit of the rapid rising of the fat droplets, after which the butyrometer, which is insulated in a known manner against loss of heat, is left to stand at the elevated temperature (40–70° C.) brought about by the internal heat of solution and neutralization until quantitative separating out of the liquid milk fat has taken place, after which the fat content is read off in the known manner against a graduated scale.

In contrast to the known methods, the protein dissolving salts become formed in this case only on the dissolving of the added solid acids and alkalies in the milk, whereby at the same time heat is also liberated. The proteins are thereby converted into the water-soluble alkaline salts, while the fat separates out from the emulsion. The lower alcohols added have for their main purpose to reduce the viscosity of the liquid and to lower the surface tension of the alkaline protein decomposition products formed. These alcohols do not therefore play the part of a fat solvent, and they are not added in such slight quantities as the higher valency alcohols in other methods, but in such large quantities that the mixture thereby becomes thinned to the requisite extent.

For the purpose of the present invention the alcohols used are added in as highly concentrated a form as possible, so that no additional water is introduced into the milk to be tested. The presence of larger quantities of water would tend to reduce again the thinness of the mixture, that is to say to counteract the effect of the addition of the specified alcohols, with the result that the fat droplets could not rise so readily and the mixture would froth violently on being shaken, thus impeding the reading off of the fat content. The absence of additional water as also of other liquids of high heat capacity, such as for example sulphuric acid, enables the evolved heat of neutralization to be made use of to particularly good advantage, since the lower alcohols have but very low heat capacity. At any rate it is a fact that when the above described procedure is followed the fat droplets can be caused to rise so rapidly and so quantitatively even without the use of a water bath, that is to say without supplementary heat supply, and without the use of a centrifuging device that the fat content can be read off after a short time (10–15 minutes).

As alcohols contemplated for the purpose of the present invention there can be mentioned as being particularly suitable methyl and ethyl alcohol, and also in certain circumstances propyl alcohol. The higher alcohols, however, are not suitable for the present purpose. Instead of alcohols there can of course also be employed other organic liquids which have the same properties as those required for the purpose of the present invention, that is to say which have low heat capacity and at the same time bring about with certainty the requisite thinning of the mixture.

The quantity of added caustic alkali and acid is preferably such that an excess of free alkali is present.

In order to enable the fat determining method according to the present invention to be carried out expeditiously anywhere without any special manipulations, the solid alkalies and solid acids in accordance with the invention are made up into separate tablets or the like suitably proportioned for an analysis to be made with one of each. The alcohol can likewise be provided in apportioned quantities (for example in ampullae) each suitable for the carrying out of one analysis or test.

According to a special form of the invention, fat solvents can also be added to the mixture to aid the separating out of the fat. If fat solvents are used which are insoluble in water, such as for example petroleum ether, the quantity of such solvent simultaneously separated out must be deducted on the reading off of the fat content. Such allowance need not be made in the case of the addition of fat solvents such as for example ketones which become entirely dissolved in water in the slight quantities in which they are added.

An addition of approximately 1 gram of neutral salts, such as for example sodium chloride, potassium bromide, and the like, has proved to be very advantageous for the carrying out of the method according to the present invention.

It is also possible for the purposes of the present invention to employ the usual butyrometers, although it is advisable to modify them somewhat in shape and dimensions to suit the altered reaction conditions.

Examples

The following examples are given to illustrate in greater detail the manner in which the present invention is put into practice.

(1) To 11 ccs. of milk, which are placed in a butyrometer of approximately 20 ccs. capacity, there is added 4 ccs. of ethyl alcohol (in which with advantage there can be dissolved fat-dissolving dyestuff), 2 grams of caustic potash (or the corresponding quantity of caustic soda) in the solid state and in a condition to present as large a total superficial area as possible, and then a mixture consisting of 1 gram of tartaric acid and 1 gram of salicylic acid (or its amido acid). The butyrometer is then closed and shaken for about one minute during which time the contents of the small bulb must become intermixed several times with the remaining quantity of liquid. The butyrometer is then left to stand at rest for 10 to 15 minutes in a heat-insulating covering, with the graduated scale in a vertical position; in the course of this space of time, as a consequence of the internal reaction heat, the yellowish butter fat, or the butter fat coloured by the added dyestuff, separates out and can be measured, after the known adjustment, in the usual manner with the aid of the rubber stopper which seals the butyrometer. The heat insulating covering can if desired be provided on the butyrometer from the outset, a slit being left in such covering through which the graduated scale can be read.

For the practicing of the method according to the present invention all that is required therefore is a butyrometer, a pipette to be used once for measuring in the quantity of milk to be tested, a certain amount of alcohol and possibly of a fat solvent, and a certain amount of solid alkalies and solid acids.

(2) To 11 ccs. of milk in a heat-insulated butyrometer there is added a mixture consisting of 3 ccs. of ethyl alcohol and 0.5 cc. of petroleum ether, after which the same quantities of caustic alkali and acid are added as in Example (1), and the further treatment conducted as in that example. In reading off the fat content allowance must be made for the quantity of petroleum ether added.

(3) As Example (2), but with the use of 4 ccs. of ethyl alcohol, and 0.5 cc. of sulphuric ether instead of petroleum ether.

(4) As Example (3), but using 2 ccs. of fuel spirit and 0.3 cc. of methyl ethyl ketone.

(5) As Example (1), but using 1.5 grams of salicylic acid (or it amido acid) and 1.5 grams of tartaric acid.

In the above examples the caustic alkalies can also be replaced by the same or equivalent quantities of aliphatic or aromatic amines, and the ethyl alcohol by homologous alcohols of the fatty series or by aromatic alcohols such as for example phenyl alcohol. In accordance with the invention the petroleum ether used can be replaced by equal quantities of hydrated hydrocarbons. For the purpose of neutralizing the alkalies there can also be employed other acids, provided their salts have protein-dissolving properties, such as for example oxalic acid and thiocyanic acid.

In determining the fat content of solid dairy products, such as for example cheese, a predetermined quantity by weight of the product to be tested is finely distributed or dispersed in so much water that the quantity of water in the resulting suspension corresponds to that in the test quantity (11 ccs.) of milk. Thus for example if the fat content of cheese is to be determined in accordance with Example (1) there is introduced into the butyrometer 1 gram of cheese finely dispersed in approximately 10 ccs. of water.

The method provided by the present invention enables any one, whether skilled or not, to carry out fat determining tests wherever required, at the farm, in the dairy, in the stable, so that both buyer and seller can watch the test being made. There is thus no time lost in despatch, and there is no danger of samples getting lost or exchanged during transit. This new method implies a saving of time and expense in every respect as compared with hitherto known methods.

I claim:

1. The herein described method of determining the fat content of dairy products containing milk albumen and fats, which method consists in introducing a predetermined quantity of the matter to be tested into a butyrometer, adding a quantity of a basic substance selected from the group consisting of solid caustic alkalis, aliphatic amines and aromatic amines, and a quantity of solid acids of a nature to yield protein-dissolving salts in a proportion to produce an excess of free basic substance in the mixture, superadding a sufficient quantity of concentrated lower alcohols selected from the group consisting of methyl alcohol, ethyl alcohol and propyl alcohol to substantially reduce the viscosity of the mixture, thoroughly mixing the components by shaking the butyrometer for about one minute, and then leaving the butyrometer standing at the elevated temperature of 40°–70° C. brought about by the internal heat of solution and neutralization for about fifteen minutes under heat insulating conditions, until a quantitative separation of the liquid milk fat has taken place.

2. A method, as claimed in claim 1, for determining the fat content of solid dairy products containing albumens and fats, in which a predetermined quantity by weight of the product to be analyzed is finely dispersed in a predetermined quantity of water and the dispersion is introduced into the butyrometer.

GEORG MAYRHOFER.